United States Patent [19]

Nersasian

[11] 3,914,269
[45] Oct. 21, 1975

[54] STORAGE STABLE CRUDE ISOCYANATES AND PRODUCTION THEREOF
[75] Inventor: Arthur Nersasian, Wilmington, Del.
[73] Assignee: E. I. Du Pont de Nemours and Company, Wilmington, Del.
[22] Filed: Dec. 10, 1973
[21] Appl. No.: 423,018

[52] U.S. Cl. ............ 260/453 PH; 260/2.5 AT; 260/453 AB; 260/453 AR; 260/453 SP
[51] Int. Cl.$^2$ ............ C07C 118/02; C07C 119/078
[58] Field of Search.... 260/453 P, 453 PH, 453 AB, 260/453 SP

[56] References Cited
UNITED STATES PATENTS

| | | | |
|---|---|---|---|
| 3,359,295 | 12/1967 | Shultz et al. | 260/453 |
| 3,462,470 | 8/1969 | Emery et al. | 260/453 |
| 3,517,039 | 6/1970 | Wagner et al. | 260/453 |

Primary Examiner—Lewis Gotts
Assistant Examiner—Dolph H. Torrence

[57] ABSTRACT

A method for producing a storage-stable undistilled phosgenation product, preferably derived from m-toluene diamines, which comprises treating the undistilled phosgenation product with a weak acid, at an elevated temperature whereby the carbodiimides are converted to species which do not react with isocyanates.

8 Claims, No Drawings

STORAGE STABLE CRUDE ISOCYANATES AND PRODUCTION THEREOF

BACKGROUND OF THE INVENTION

Polyurethane cellular products or foams can be prepared by reacting, in the presence of a blowing agent, a polyisocyanate with a polyfunctional hydroxyl compound such as a polyether polyol. Polyurethane foams are characterized as flexible or rigid depending primarily on the extent of cross-linking in the foam structure. Foams derived from polyethers of relatively high average molecular weight and relatively low hydroxyl number are generally flexible while foams derived from polyethers of relatively low average molecular weight and relatively high hydroxyl number are generally rigid.

Various advantages such as improved flex fatigue and ease of processing accrue from the use of an undistilled phosgenation product of a primary diamine as the polyisocyanate component in whole or in part in the manufacture of a polyurethane foam.

The use of undistilled phosgenation product has, however, presented a significant problem in that the undistilled phosgenation product is not stable when stored. Typically, it will form chemical species which impart to the products poor physical properties. In particular, the compression set appears to be affected but this has not been established for all foam compositions.

The formation of the deleterious chemical species is related to the presence of free carbodiimide in the amount of about 2 to 8 percent in the undistilled phosgenation product. The carbodiimide will react with the isocyanate which is present to form this species which is a uretone imine.

SUMMARY OF THE INVENTION

According to this invention it has unexpectedly been discovered that the formation of the uretone imine, and any resulting problems in foam properties which are caused by its presence, can be substantially avoided. This may be accomplished by reacting a weak acid with the carbodiimide-containing undistilled phosgenation product; the weak acid should be added in an amount to substantially react with the carbodiimide but not react to any appreciable extent with the isocyanates present. Since the reaction of the weak acid with the isocyanate, which is in excess compared to the carbodiimides is competing with the reaction of the acid and the carbodiimide one must use a several fold molar excess. Thus one would add 1–3.5 moles of acidic protons per mole of carbodiimide. It is undesirable to go much above these amounts because further isocyanate will then react with the weak acid. After the acid is added, temperature is maintained at an elevated level so that the acid will react with the carbodiimide to form an insoluble acyl urea which is solubilized by heating in the presence of isocyanates to form soluble acyl biurets. The resulting undistilled phosgenation product is substantially storage-stable and may be utilized to prepare foams by conventional methods known in the art. Preferred weak acids are acetic, benzoic or phosphate ester acid. Weak acids may be broadly defined as having a pKa of 4–12.

DETAILED DESCRIPTION OF THE INVENTION

The undistilled phosgenation product of a primary diamine is the crude product obtained by phosgenating a primary diamine such as toluene diamine and removing the phosgenation solvent, unreacted phosgene and by-product hydrogen chloride. Such products contain the diisocyanate corresponding to the primary diamine and phosgenation by-products. Phosgenation by-products are complex, nonvolatile, hexane-insoluble materials produced by the reaction of phosgene and the primary diamine. They have been found to contain simple and polymeric biuret molecules bearing free isocyanato groups and carbodiimides. Phosgenation by-products are in essence the materials remaining in the distillation flask after the phosgenation product of a primary diamine is distilled to remove the corresponding diisocyanate, phosgenation solvent, phosgene and hydrogen chloride.

When phosgenating toluene diamines and phenylene diamines, phosgenation by-products are the materials remaining in the distillation flask after completion of distillation of the aromatic diisocyanates, phosgenation solvents, phosgene and hydrogen chloride; the distillation generally takes place at between about 1 and 5 mm. of mercury pressure and a final pot temperature in the vicinity of about 180°–220°C. The undistilled phosgenation product usually contains from about 5–50% by weight of phosgenation by-products and more typically from about 10–30% by weight of by-products.

The carbodiimides may make up about 2 to 80%, and more typically 4 to 6% of the undistilled phosgenation product.

The preferred isocyanate composition is crude m-toluene diisocyanate (TDI) which has an isocyanato content of from about 41 to 45% by weight and is obtained as a crude fraction, stripped of solvent, phosgene and hydrogen chloride in the manufacture of toluene diisocyanate by phosgenation of m-toluene diamine. An alternative isocyanate composition is a product prepared by combining the above-described crude toluene diisocyanate having an isocyanato content of 41–45% by weight with a tar component having an isocyanato group content of 20–30% and containing about 40% toluene diisocyanate and 60% phosgenation by-products, provided that the isocyanate content of the product obtained does not fall below about 41%. Such tar components are the semi-liquid "still bottoms" which in the manufacture of TDI remain in the distillation vessel as residues after the distillation of TDI.

Undistilled phosgenation products of aromatic diamines can be utilized in general with the process of this invention. Representative aromatic diamines in addition to the toluene diamines are the xylylene diamines, naphthylene diamines, 4,4'-methylene dianiline and phenylene diamines. Most preferred, as indicated above, are the undistilled phosgenation products of m-toluene diamine. This reaction product typically contains about 4 to 6% by weight of the carbodiimide.

The carbodiimide must, as indicated above, be substantially removed to prevent its reaction with isocyanates to form uretone imine on standing or storage. The presence of uretone imines is associated generally with poor foam properties, e.g., compression set. Typically the reaction reaches an equilibrium after several days. To present the uretone imine formation about 1 to 3.5 moles of weak acid acidic proton per mole of carbodiimide must be added, preferably 2 to 3 moles of the acidic proton are added. As a rule more than a stoichiometric amount is added because the weak acid-isocyanate reaction is competitive with the weak acid-carbodiimide reaction. A large excess, however, must not be added since it will react further with the diisocyanate.

The weak acid may be defined as having a pKa of 4–12. Suitable acids are listed at pages 1644–45 of the Handbook of Chemistry and Physics, 39th Edition, Chemical Rubber Publishing Co., Cleveland, Ohio, which is hereby incorporated by reference. The preferred weak acids which may be added are acetic, benzoic, di-n-butyl phosphate or n-butyl phosphate or mixtures thereof. Most preferred is acetic acid.

The weak acid, e.g., acetic acid, and the phosgenation product, which is preferably the result of the phosgenation of m-toluene diamine, are mixed and the temperature raised to about 50°–100°C., preferably 80°–100°C. for a period of 10 to 40 minutes, preferably 20 to 35 minutes. Pressure may be elevated if desired but ambient is preferable.

At the end of this time substantially all of the carbodiimide is converted to the corresponding insoluble acyl urea which is converted to the soluble acyl buiret by further heating at 100°–160°C, preferably 130°–150°C.

The resulting phosgenation product, containing the acyl biuret and no more than about 1% of carbodiimide may be reacted by conventional methods to form a foam.

Methods of producing polyurethane foams which can be used in this invention are known in the art. Such methods are described in U.S. Pat. No. 3,471,417 to Dickert; 3,471,418 to Dickert and copending applications Ser. No. 801,148 filed Feb. 20, 1969, now U.S. Pat. No. 3,644,235 and Ser. No. 4,062 filed Jan. 19, 1970, now abandoned. The undistilled phosgenation product of this invention is not restricted to use with the previously mentioned processes. In fact, it is preferred to use it for the manufacture of rigid foam and semi-rigid foam products. The foams can be prepared by one-shot, quasi-prepolymers, or prepolymer methods. To simplify preparation, certain foam components can be mixed into masterbatches prior to foaming as is known in the art. The process is suitable for molded foams or slab stock.

The polyalkyleneether polyol which is reacted with the undistilled phosgenation product to produce the polyurethane foams of this invention are well known in the art. Such polyols are described in the U.S. patents cited herein as describing foam production methods. Polyols useful for this invention have a number average molecular weight of about 3,000–8,000 and preferably 4,500–7,000. The preferred polyalkyleneether polyols are polyalkyleneether glycols or triols or mixtures thereof but the polyol can also contain minor amounts of higher (higher than 3) funcionality polyols. Polyalkyleneether polyols of this type can be obtained by reaction of an alkylene oxide, for example, ethylene oxide, propylene oxide, trimethylene oxide or butylene oxide or mixtures thereof, with a polyhydric alcohol such as ethylene glycol, propylene glycol, dipropylene glycol, tetramethylene glycol, glycerol, trimethylol propane or a mixture thereof. Activated or balanced polyols may also be used. Activated polyols are prepared from a mixture of alkylene oxide such as ethylene oxide and propylene oxide, and balanced polyols are prepared by separately reacting different alkylene oxides so that a block copolymer containing two or more different poly(oxyalkylene) blocks is obtained. Depending on the reactants used and the method of manufacture, polymeric polyols derived from alkylene oxides can contain only secondary hydroxyl groups or a mixture of secondary and primary hydroxyl groups. By finally reacting these polyols with ethylene oxide, modified polyols having a high content of primary hydroxyl groups are obtained. These modified polyols are generally referred to as capped or tipped polyether polyols and can be used with advantage in this invention.

In the formation of a foam a cross-linking agent is also needed. The amount of cross-linking agent determines essentially whether the foam will be rigid, semi-rigid or flexible. In total up to about twenty parts of cross-linking agent per 100 parts of polyalkyleneether polyol would generally be used for producing the foams in this invention, preferably 1–10 parts.

Preferred cross-linking agents include (1) aromatic diamines and polyamines such as 4,4'-methylene bis(o-chloroaniline), methylene dianiline, m-tolylene diamine, m-phenylene diamines, 3,3-dichlorobenzidine, 1,5-diaminonaphthalene, and condensation products of aniline or mixtures of aniline and o-chloroaniline with formaldehyde having functionalities greater than two as disclosed in U.S. Pat. Nos. 2,683,730 to Seeger et al. and 3,563,906 to Hoeschele; (2) low molecular weight polyols containing tertiary amine nitrogens such as triethanolamine, methyldiethanolamine, N,N,N',N'-tetrakis(2-hydroxypropyl) ethylene diamine; and (3) low molecular weight polyols containing only C, H, and O. such as glycerol, trimethylolpropane, sorbitol, diethylene glycol, pentaerythritol, 1,2,6-hexanetriol, butanediol-1,4, dipropylene glycol, and ethylene glycol. The aromatic diamines and polyamine are normally used in concentrations of about 1–10 phr and preferably 2.5–8 phr. The low molecular weight polyols containing tertiary amine nitrogen are usually used in amounts up to 12 phr and preferably 2–6 phr. Polyols containing C, H, and O are used in amounts up to 20 phr. Foam can be produced using the crude diisocyanate of this invention without a cross-linking agent; but a cross-linking agent is preferred.

Any of the catalysts generally used for preparation of polyurethane foams can be used for this invention. These catalysts include tin compounds such as stannous salts of organic acids and organo-tin compounds, tertiary amines such as bis(dimethylaminoethyl)ether, triethylene diamines, N-ethyl morpholine and trimethyl piperazine, and urea. Other suitable catalysts include lead salts, iron salts, chelates of transition metals, substituted guanidines and amidines, urea, and urea derivatives. Combinations of these catalysts can also be used. The preferred catalyst is triethylene diamine. The amount of catalyst depends upon the foam formation rate desired. Generally, more catalyst is required when using crude diisocyanate having a higher acidity. The concentration of catalyst can be readily determined for a particular foam system and the reaction rate desired.

Blowing agents and the methods for using them which can be used for producing the foam of this invention are well known in the art. Generally, water is required for producing flexible foam with acceptable hardness and elastomeric properties. Other blowing agents such as fluorocarbon and methylene chloride can be used with water to reduce hardness or to obtain very low density. Generally, up to 5 phr water can be used for acceptable properties and preferably 2–3.5 phr water for a foam density of 2–4 lb. per cubic foot (lb/ft³).

No surfactant is required to produce the foams of this invention. Minor amounts of selected surfactants are, however, generally desirable to produce slab or molded foam without excessive waste and with high quality surface texture. The preferred surfactant to be used is polydimethyl siloxane oil, 5 centistoke grade. Up to 0.5 phr of this surfactant can be used and preferably 0.01–0.03 phr. Other silicone oils can be used in minor amounts and poly(dimethyl siloxane)-poly(oxoalkylene) block copolymers can also be used. Excessive amounts of surfactant may reduce flame resistance.

A benefit of the process is the reduction in total acidity and hydrolyzable chloride which is greater than achieved by a simple heat treatment.

Other additives such as pigments, stabilizers, fillers, and flame retardants can be used for the foam of this invention to change particular properties such as density, color, unit cost, load-bearing ability, sag factor, flammability, etc. The use of such additives is well known in the art.

The following examples illustrate the invention. Parts, percentages and ratios are by weight unless otherwise indicated.

EXAMPLE 1

Toluene diamine (about 80% 2,4-isomer and 20% 2,6-isomer) is dissolved in o-dichlorobenzene and phosgenated substantially by the procedure disclosed in U.S. Pat. No. 2,822,373. Following the phosgenation, o-dichlorobenzene is removed by fractional distillation at reduced pressure at a bottoms temperature of 160°–170°C. The resulting undistilled toluene diisocyanate contains about 90% volatile toluene diisocyanate with the remainder being phosgenation by-products. The material has an —NCO content ranging from 42 to 44% by weight determined by ASTM procedure D-1638.

EXAMPLE 2

One hundred gm. of the crude isocyanate of Example 1 (42.9% isocyanate; 0.033% hydrolyzable chlorine; 0.030% total acidity; ~6% carbodimide) was stirred in a flask equipped with a reflux condenser and heated for 30 min. at 150°C. under a dry nitrogen atmosphere. It was cooled to 100°C. and reagent grade glacial acetic acid (3 gm.) was added. The stirred mixture was heated for 30 min. at 100°C. and then for 30 min. at 150°C. The flask was equipped for distillation and evacuated to 50 mm of mercury. The unreacted acetic acid and acetic anhydride by-product (Zetsche, F., et. al., Ber., 71, 1088 (1938)) were removed by distillation. The product contained 42.5% isocyanate, 0.025% hydrolyzable chlorine and 0.007% total acidity as determined by known ASTM methods.* Analyses based on infrared spectroscopy and liquid phase gel permeation chromatography showed the sample to contain no carbodimide.

* ASTM-D-1638 and modifications disclosed in U.S. Pat. No. 3,522,285.

EXAMPLE 3

Crude isocyanate of Example 1 (22,700 gm.) (43.80% isocyanate; 0.116% hydrolyzable chlorine; 0.081% total acidity; 3% carbodiimide) was stirred under a dry nitrogen atmosphere in flask equipped with a refulx condenser and heated for 30 min. at 150°C. It was cooled to 100°C. and treated with 504 gm. of glacial acetic acid. After the mixture was stirred for 30 min. at 100°C. it was heated for 15 min. at 150°C., evacuated to 50 mm. of mercury and the unreacted acetic acid and by-product acetic anhydride were removed by distillation. The product contained 43.3% isocyanate, 0.040% hydrolyzable chlorine, 0.019% total acidity, and no carbodimide.

EXAMPLE 4

One hundred gm. of crude isocyanate (43.1% isocyanate; 0.091% hydrolyzable chlorine; 0.070% total acidity; 6% carbodimide) was stirred in a dry nitrogen atmosphere in a flask equipped with a reflux condensed and heated for 30 min. at 150°C. In one step 5g of a 55/45 wt. % mixture of technical grade di-n-butylphosphate and n-butylphosphate was added to the crude isocyanate at 150°C. and stirred for 30 min. at 150°C. The product contained 42.4% isocyanate, 0.024% hydrolyzable chlorine, 0.185% total acidity and no carbodimide. The increased total acidity is believed to be due to the formation of pyrophosphates (Khorana, H. G. and Todd, A. R., J. Chem. Soc., 2257 (1953); Smith, J. G. Moffatt, J. G. and Khorana, H. G., J. Am. Chem. Soc., 80, 6204 (1958)) which would titrate as acid with alcoholic KOH.

EXAMPLE 5

One hundred gm. of crude isocyanate equivalent to that used in Example 4 was heated for 30 min. at 150°C. Benzoic acid (6 gm.) was added in one step at 150°C and the mixture was stirred at 150°C. for 30 min. The product contained 41.9% isocyanate, 0.096% hydrolyzable chlorine, 0.083% total acidity and no carbodimide. The high acidity is thought to be due to by-product benzoic anhydride (see Example 1) which was not removed by distillation.

EXAMPLE 6

Masterbatch formulation (Table I, 110 parts) at 110°F and untreated crude isocyanate (hot NCO=43.8%, hydrolyzable chlorine=0.116%, total acidity 0.081%, 39 parts) at 80°F were metered into the mixing head of an Admiral Mixer operated at 5000 rpm. The feed streams were adjusted to obtain an isocyanate index of 100. The intimately mixed streams were allowed to fill an automotive bucket seat mold preheated to 180°F. The foam was cured for 30 min. at 250°F and then tested as shown in Table II.

EXAMPLE 7

The crude isocyanate used to make the foam described in this example was prepared from the crude isocyanate of Example 6 according to Example 2 except that the final sample at 150°C. was not evacuated to 50 mm. It contained 43.8% hot NCO, 0.074% hydrolyzable chlorine and 0.059% total acidity. A foam was prepared and cured according to the manner described in Example 6. Test data are given in Table II.

Table I

Masterbatch Formulation For Foam Preparations
(Examples 6 and 7).

| (a) CP 4701 | 100 |

Table I-Continued

Masterbatch Formulation For Foam Preparations
(Examples 6 and 7).

| | | |
|---|---|---|
| (b) | Niax 34-28 | — |
| (c) | LD 813 | 3.5 |
| | Water | 2.7 |
| (d) | DC-200 | 0.025 |
| (e) | Dabco 33LV | 0.5 |
| (f) | NEM | 0.3 |
| (g) | Fyrol 32B | 3 |

(a) 4700 MW triol (Dow) from glycerine, propylene oxide polymer capped with ethylene oxide.
(b) Grafted polyol (Union Carbide).
(c) Mixture of diamine, 40% MOCA (Du Pont).
(d) Silicone surfactant (Dow Corning).
(e) 33% solution of triethylenediamine in dipropylene ether glycol.
(f) N-ethyl morpholine.
(g) Fire retardant (Stauffer).

TABLE II

Properties of Foam Made From Crude Isocyanate and Acetic Acid-Treated Crude Isocyanate.

| | Example 6<br>Crude Isocyanate | Example 7<br>Acetic Acid Treated Crude Isocyanate |
|---|---|---|
| Density, lbs./ft. | 2.8 | 2.8 |
| Tensile, psi | 20 | 18 |
| Elongation, % | 166 | 163 |
| Split Tear, pli | 2.4 | 2.0 |
| 75% C/S, after 5 days % | 7 | 8 |
| 12 days, % | 7 | 5 |
| 90% C/S, after 5 days, % | 58 | 8 |
| 12 days, % | 8 | 5 |
| 50% C/S, Original, % | 10 | 7 |
| Age 5 hrs./15 lbs., % of steam (250°F) | 26 | 29 |

I claim:

1. In a process wherein an aromatic diamine is reacted with phosgene to form an undistilled diisocyanate-containing phosgenation product which also contains carbodiimide impurities, and thereafter the phosgenation solvent, unreacted phosgene, and by-products hydrogen chloride is removed from said undistilled diisocyanate-containing phosgenation product, the improvement comprising adding to the latter a weak acid in an amount of 1 to 3.5 moles of weak acid acidic proton per mole of carbodiimide, and raising the temperature, whereby substantially all of the carbodiimides are converted in two stages to an acyl biuret, the first stage taking place at a temperature of from 50° to 100°C., and the second stage at a temperature of from 100° to 160°C., and recovering a substantially storage-stable undistilled phosgenation product.

2. The process of claim 1 wherein a maximum of 1% of carbodiimide remains after reaction with the weak acid.

3. The process of claim 1 wherein said weak acid has a pKa of 4 to 12.

4. The process of claim 1 wherein said weak acid is selected from the group consisting of acetic, benzoic, di-n-butyl phosphate, n-butyl phosphate, and mixtures thereof.

5. The process of claim 4 wherein said weak acid is acetic acid.

6. The process of claim 1 wherein said aromatic diamine is m-toluene diamine and said diisocyanate is m-tolylene diisocyanate.

7. The product prepared by the process of claim 1.

8. The product prepared by the process of claim 6.

* * * * *